US007010514B2

(12) United States Patent
Maekawa et al.

(10) Patent No.: US 7,010,514 B2
(45) Date of Patent: Mar. 7, 2006

(54) BLIND SIGNAL SEPARATION SYSTEM AND METHOD, BLIND SIGNAL SEPARATION PROGRAM AND RECORDING MEDIUM THEREOF

(75) Inventors: Satoshi Maekawa, Tokyo (JP); Manabu Kotani, deceased, late of Hyogo (JP); by Hiroko Kotani, legal representative, Ashiya (JP); Tomoya Okumura, Osaka (JP)

(73) Assignee: National Institute of Information and Communications Technology, Tokyo (JP)

( * ) Notice: Subject to any disclaimer, the term of this patent is extended or adjusted under 35 U.S.C. 154(b) by 35 days.

(21) Appl. No.: 10/790,241

(22) Filed: Mar. 2, 2004

(65) Prior Publication Data

US 2005/0055388 A1    Mar. 10, 2005

(30) Foreign Application Priority Data

Sep. 8, 2003    (JP)    ............................. 2003-315144

(51) Int. Cl.
   *G06G 7/00*    (2006.01)
   *G06F 15/00*    (2006.01)
(52) U.S. Cl. ........................................ 706/20; 702/190
(58) Field of Classification Search ............ 702/74–76, 702/194, 193, 196, 124, 190, 69, 198, 126; 381/20, 92, 94.1; 706/20, 22
   See application file for complete search history.

(56) References Cited

U.S. PATENT DOCUMENTS

| | | | |
|---|---|---|---|
| 6,424,960 B1 * | 7/2002 | Lee et al. ...................... 706/20 |
| 2003/0061035 A1 * | 3/2003 | Kadambe .................... 704/203 |

OTHER PUBLICATIONS

P. Bofill and M. Zibulevsky, "Blind Separation of More Sources Than Mixtures Using Sparsity of Their Short-Time Fourier Transform," Proc. of ICA Workshop, Jul. 1999, pp 87-92.*

L. Q.Zhang et al., "Multichannel Blind Deconvolution of Non-minimum Phase Systems Using Information Backpropagation", SSN 0042-6989, vol. 37, No. 23, Dec. 1997, In Proceeding of 6th International Conference on Neutral Information Processing (ICONIP'99), pp. 210-216, (1999).

B.A. Olshausen et al., "Sparse Coding with an Overcomplete Basis Set: A Strategy Employed by VI?", USSN-6989, vol. 37, No. 23, pp. 3311-3325, (1997).

B.A. Olshausen et al., "Emergence of simple-cell receptive field properties by learning a sparse code for natural images", NATURE, vol. 381, pp. 607-609, (Jun. 1996).

(Continued)

*Primary Examiner*—Marc S. Hoff
*Assistant Examiner*—Janet L Robbins

(57) ABSTRACT

The present invention enable to separate source signals from mixture signals into which the source signals are mixed temporally and spatially, where the number of source signals is more than or equal to the number of mixture signals. A signal storing portion 12 stores the mixture signals input into a signal input portion 11, and a formulation portion 131 in a signal separation portion 13 extracts the mixture signals stored in the signal storing portion 12 and formulates them as an operation expression using a basis matrix composed of plural small matrixes that consist of bases with time symmetry. A learning algorithm application portion 132 applies a learning algorithm based on overcomplete representations, a mixture matrix calculating portion 133 calculates a mixture matrix, a source signal estimating portion 134 estimates source signals separated from the mixture signals, and an output portion 14 outputs the calculated mixture matrix and the estimated source signals.

6 Claims, 13 Drawing Sheets

OTHER PUBLICATIONS

B.A. Olshausen et al., "Natural image statistics and efficient coding", Network, vol. 7, pp. 333-339, (1996).

M.S. Lewicki et al., "Learning Overcomplete Representations", Neutral Computation, vol. 12, pp. 337-365, (2000).

T.W. Lee, et al., "Blind Source Separation of More Sources Than Mixtures Using Overcomplete Representations", IEEE Signal Processing Letters, vol. 6, No. 4, Apr. 1999, pp. 87-90.

M.S. Lewicki et al., "Learning nonlinear overcomplete representations for efficient coding", Advance in Neutral and Information Processing Systems 10, pp. 556-562, (1997),.

* cited by examiner

Fig. 10

$$\begin{bmatrix} x_1 \\ x_2 \end{bmatrix} = \begin{bmatrix} [A_{11}] & [A_{12}] & [A_{13}] \\ [A_{21}] & [A_{22}] & [A_{23}] \end{bmatrix} \begin{bmatrix} s_1 \\ s_2 \\ s_3 \end{bmatrix}$$

$$\Downarrow$$

$$[A_{ij}] = \begin{bmatrix} A_{ij}(31) & \cdots & A_{ij}(0) & \cdots & A_{ij}(-31) & & \\ & \ddots & \ddots & \ddots & \vdots & \ddots & \\ & & A_{ij}(31) & \ddots & A_{ij}(0) & \ddots & A_{ij}(-31) \\ & & & \ddots & \vdots & \ddots & \ddots & \ddots \\ & & & & A_{ij}(31) & \cdots & A_{ij}(0) & \cdots & A_{ij}(-31) \end{bmatrix}$$

Fig. 12

$$[s_j] = \begin{bmatrix} s_j(-62) \\ \vdots \\ s_j(0) \\ \vdots \\ s_j(62) \end{bmatrix}$$

Fig. 13

$$\left[ A_{ij} \right] = \begin{bmatrix} A_{ij}(31) \cdots A_{ij}(0) & \cdots & A_{ij}(-31) & & & \\ & \ddots & \ddots & \ddots & \vdots & \ddots & \\ & & A_{ij}(31) & \ddots & A_{ij}(0) & \ddots & A_{ij}(-31) \\ & & & \ddots & \vdots & \ddots & \ddots \\ & & & & A_{ij}(31) & \cdots & A_{ij}(0) & \cdots & A_{ij}(-31) \end{bmatrix}$$

Fig. 14

$$\begin{bmatrix} [\hat{A}_{11}] & [\hat{A}_{12}] & [\hat{A}_{13}] \\ [\hat{A}_{21}] & [\hat{A}_{22}] & [\hat{A}_{23}] \end{bmatrix} \Rightarrow [A]$$

|  | $s_1(t)$ | $s_2(t)$ | $s_3(t)$ |
|---|---|---|---|
| Estimated signal 1 | -0.0184 | 0.9965 | -0.0095 |
| Estimated signal 2 | 0.9985 | -0.0186 | 0.0058 |
| Estimated signal 3 | -0.0051 | 0.0099 | -0.9976 |

Fig. 18

$$\begin{bmatrix} x(-q) \\ \vdots \\ x(0) \\ \vdots \\ x(q) \end{bmatrix} = \begin{bmatrix} & & A & & \end{bmatrix} \begin{bmatrix} s(-2q) \\ \vdots \\ \vdots \\ s(0) \\ \vdots \\ \vdots \\ s(2q) \end{bmatrix}$$ (formula 12)

$$\begin{bmatrix} A(q) & \cdots & A(0) & \cdots & A(-q) & & & \\ & \ddots & \ddots & \ddots & \vdots & \ddots & & \\ & & A(q) & \ddots & A(0) & \ddots & A(-q) & \\ & & & \ddots & \vdots & \ddots & \ddots & \\ & & & & A(q) & \cdots & A(0) & \cdots & A(-q) \end{bmatrix}$$ (formula 13)

Fig. 19

$$\begin{bmatrix} [x_1] \\ \vdots \\ [x_m] \end{bmatrix} = \begin{bmatrix} [A_{11}] & \cdots & [A_{1n}] \\ \vdots & \ddots & \vdots \\ [A_{m1}] & \cdots & [A_{mn}] \end{bmatrix} \begin{bmatrix} [s_1] \\ \vdots \\ [s_n] \end{bmatrix} \quad \text{(formula 14)}$$

Fig. 20

$$[A] = \begin{bmatrix} [A_{11}] & \cdots & [A_{1n}] \\ \vdots & \ddots & \vdots \\ [A_{m1}] & \cdots & [A_{mn}] \end{bmatrix}$$

Fig. 21

$$[A_{ij}] = \begin{bmatrix} A_{ij}(q) & \cdots & A_{ij}(0) & \cdots & A_{ij}(-q) & & \\ & \ddots & \ddots & \ddots & \vdots & \ddots & \\ & & A_{ij}(q) & \ddots & A_{ij}(0) & \ddots & A_{ij}(-q) \\ & & & \ddots & \vdots & \ddots & \ddots & \ddots \\ & & & & A_{ij}(q) & \cdots & A_{ij}(0) & \cdots & A_{ij}(-q) \end{bmatrix}$$

BLIND SIGNAL SEPARATION SYSTEM AND METHOD, BLIND SIGNAL SEPARATION PROGRAM AND RECORDING MEDIUM THEREOF

BACKGROUND OF THE INVENTION

1. Technical Field to which the Invention Pertains

The present invention relates to a blind signal separation technique, and more particularly to a blind signal separation system and method, a blind signal separation program and a recording medium thereof, in which a source signal is separated from a mixture signal into which the source signal with a time delay is mixed.

2. Description of the Related Art

In a blind signal separation problem, there is a blind deconvolution method especially as a method for separating a signal mixed with a time delay. Zhang et al. proposed a method for learning a linear filter to minimize the KL divergence (Kullback-Leibler divergence) to an output signal, which is used as a measure of statistical independence for an observed signal into which plural independent signals are mixed temporally and spatially, thereby making a multi-channel blind signal separation.

On the other hand, there is a method using a learning algorithm based on overcomplete representations in the case where the number of independent signals is more than the number of observed signals. Olshausen et al. proposed a sparse coding network for learning to minimize an evaluation function which is defined by a square error between an input signal and an estimated model and the sparseness of an output signal. Also, according to Lewicki et al., the blind signal separation is achieved by maximizing a posteriori probability of input data based on a maximum likelihood estimation.

A learning algorithm proposed by Lewicki et al. will now be outlined below. When a source signal $s=\{s_1, \ldots, s_n\}$ that is an n-dimensional independent signal is mixed into an m-dimensional mixture signal $x=\{x_1, \ldots, x_m\}$, the source signal is formulated as follows.

$$x=As \quad \text{(formula 1)}$$

In the formula 1, A is an m×n matrix (basis matrix). Considering each column of the basis matrix A as a basis function, each element of s is a coefficient (basis coefficient) of each basis function. Moreover, supposing that m≦n, the mixture signal x is represented as a linear sum of overcomplete basis. The purpose here is to estimate the optimal basis matrix A and the source signal s from only the information of the mixture signal x. The optimal basis matrix A estimated here is the mixture matrix for mixing the source signal s to produce the mixture signal x.

In the following, an estimation method for solving them will be described from the viewpoint of probability theory. First of all, estimation of the basis coefficients is made. Since the basis is overcomplete, s satisfying the formula 1 is not uniquely determined. Thus, the optimal s is acquired by maximizing the posteriori probability P(s|x,A) of s. This is achieved by solving a linear programming problem as follows.

$$\min c^T|s|, \text{ subject to } As=x \quad \text{(formula 2)}$$

Where $c=(1, \ldots, 1)$, and the objective function of linear programming is $c^T|s|=\Sigma_k|s_k|$. This is equivalently achieved by maximizing a priori probability distribution P(s) under the condition As=x. It is assumed that P(s) is a Laplacian distribution with sparseness as follows.

$$P(s_k) \propto \exp(-\theta|s_k|)$$

Where θ is a parameter for deciding the variance.

A learning algorithm for finding the most adaptable basis to the data structure is derived below. Here, a logarithmic posteriori probability for certain data x $$\log P(x|A)=\log \int P(s)P(x|A,s)ds \quad \text{(formula 3)}$$

is regarded as a likelihood function, and the optimal basis is derived based on the maximum likelihood estimation that acquires A with the maximal likelihood. The maximum likelihood value A is searched by a gradient method by learning so that a derivative $$\partial \log P(x|A)/\partial A$$

is zero.

However, the integration calculation of formula 3 to acquire P(x|A) is typically difficult, and its value can not be specifically obtained. Hence, an approximation expression that is obtained by expanding P(x|A) around ^s by a saddle point method is employed to obtain $$\log P(x|A) \approx const. + \log P(^\wedge s) - \frac{\lambda}{2}(x-A^\wedge s)^2 - \frac{1}{2}\log \det H \quad \text{(formula 4)}$$

Here, $$\lambda=1/\sigma^2, H=\lambda A^T A - \nabla_s \nabla_s \log P(^\wedge s)$$

Where σ denotes a standard deviation of noise (x−As). ^s is a solution in the formula 2. A learning rule is obtained from a derivative of log P(x|A) by A. If it is supposed that $$\nabla=\partial/\partial A$$

the learning rule is given by the following expression (e.g., refer to "Learning overcomplete representations." M. S. Lewicki and T. J. Sejnowski, Neural Computation, Vol. 12).

$$\Delta A = AA^T \nabla \log P(x|A) \quad \text{(formula 5)}$$

$$\approx -A(z^\wedge s^T + I) \quad \text{(formula 6)}$$

Here, $$z_k=\partial \log P(^\wedge s_k)/\partial s_k$$

Using the learning rule ΔA as obtained above, the basis matrix A is corrected by learning according to the following procedure. Correction with the learning rule ΔA is made for each element of the basis matrix A immediately before correction.

(1) When the mixture signal x is the input signal, s is obtained from the input signal x and the basis matrix A by the linear programming method of the formula 2.

(2) ΔA in the formula 6 is calculated using s obtained according to the procedure (1), and the basis matrix A is corrected by the following expression.

$$A^{new}=A^{old}+\eta \Delta A \quad \text{(formula 7)}$$

Where $A^{new}$ and $A^{old}$ denote basis matrixes before and after correction, respectively, and η is a learning ratio.

(3) The above procedures (1) and (2) are repeated until the basis matrix A converges. A converged value of the basis matrix A is calculated as a mixture matrix. Also, a solution ^s in the formula 2 when the basis matrix A takes the converged value is an estimated source signal.

However, in the conventional techniques, because a linear filter is employed in the algorithm of the blind deconvolution method, there is a limitation that the independent signals can not be extracted beyond the number of mixture signals.

Also, in the signal separation algorithm based on overcomplete representations as proposed by Lewicki et al., there is a problem that it is difficult to deal with the signal (temporally and spatially mixed signal) into which the source signal is mixed with a time delay, although the independent signals can be obtained beyond the number of mixture signals. The reason for this is as follows.

For example, a sinusoidal time series signal is considered. In the sinusoidal wave, only if two basis functions (e.g., sin θ and cos θ) with different phases are prepared, the sinusoidal wave with arbitrary phase can be represented in a linear combination of them. This indicates that the sinusoidal wave with different phase lies on the two-dimensional plane, irrespective of the number of sampling points.

However, the typical signal waveform is rarely contained in such small dimensions. For example, considering a signal waveform such as a delta function, all spaces created by the sampling points are covered as the time passed, and it is impossible to represent the time lag by a linear combination of a small number of different bases. This always happens with the aperiodic waveform.

From the above discussion, it is required to prepare the bases corresponding to all the time lags to deal with the signal mixed temporally and spatially. That is, this requires a great number of bases given by the number of sampling points×number of kinds of bases. In this case, each basis for the same kind of signal waveform is simply the signal with time lag which should have similar figure.

When the signal separation algorithm using the overcomplete basis as proposed by Lewicki et al. is directly applied, it is still possible but very difficult to extract such a great number of bases by learning.

SUMMARY OF THE INVENTION

The present invention has been achieved to solve the above-mentioned problems associated with the conventional techniques, and it is an object of the invention to provide a blind signal separation system and method, a blind signal separation program and a recording medium thereof, in which the source signals are separated from the mixture signals into which the source signals are mixed temporally and spatially, when the number of source signals is more than or equal to the number of mixture signals.

In order to achieve the above object, in the present invention, first of all, the mixture signals into which the source signals are mixed temporally and spatially are input. Then, the input mixture signals are formulated as an operation expression with a basis matrix composed of plural small matrixes which are the bases with time symmetry. Then, this invention applies a learning algorithm based on overcomplete representations as proposed by Lewicki et al.

In this invention, when the learning algorithm based on overcomplete representations is applied, only the bases located in the middle column of the basis small matrixes composing the basis matrix before correction are corrected in accordance with the formula 7. And in the present invention, the new small matrixes composed of the bases located in the middle column after correction and plural vectors with the bases shifted successively in phase are created.

And in the invention, the learned basis matrix is constructed based on the newly created small matrixes. In the present invention, it is determined whether or not the basis matrix has fully converged. If the basis matrix has fully converged, a converged value of the basis matrix is calculated as a mixture matrix, and the source signals are estimated.

BRIEF DESCRIPTION OF THE DRAWINGS

FIG. 10 shows an operation expression for formulating the mixture signals;

FIG. 11 shows the basis small matrixes $A_{ij}$;

FIG. 12 shows the data configuration of the source signals $s_j$;

FIG. 13 shows the bases to be corrected;

FIG. 14 shows a learned basis matrix;

FIG. 18 is a diagram showing formula 12 and formula 13.

FIG. 19 is a diagram showing formula 14.

FIG. 20 is a diagram showing basis matrix A.

FIG. 21 is a diagram showing basis small matrix.

DETAILED DESCRIPTION OF THE PREFERRED EMBODIMENTS

Figure 2:
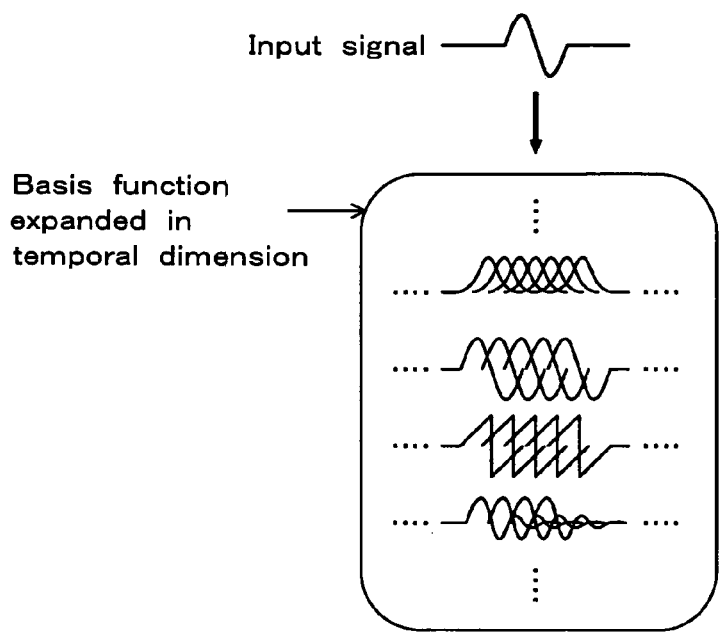
FIG. 2 is a chart showing an input signal and the bases.

As shown in FIG. 2, to suppress temporal movement of components constituting an input signal, the bases each having the same shape but different phase are prepared over the entire phase. In this manner, the components contained in the input signal to be analysed can be grasped properly on the bases by expanding the bases in temporal dimension, irrespective of the phase of components. Accordingly, there is an advantage that the property or feature of the temporally changing signal can be grasped correctly by considering the phase symmetry (temporal symmetry) in the bases, making the analysis of the signal more correct.

Hence, in order to solve the above-mentioned problem, the present invention introduces phase symmetry (temporal symmetry) into the bases and considers the mixture of signals with time delay in accordance with Lewickis' algorithm based on overcomplete representations, making it possible to separate the source signals from the mixture signals into which the source signals are mixed temporally and spatially, where the number of source signals is greater than or equal to the number of mixture signals.

Figure 3:
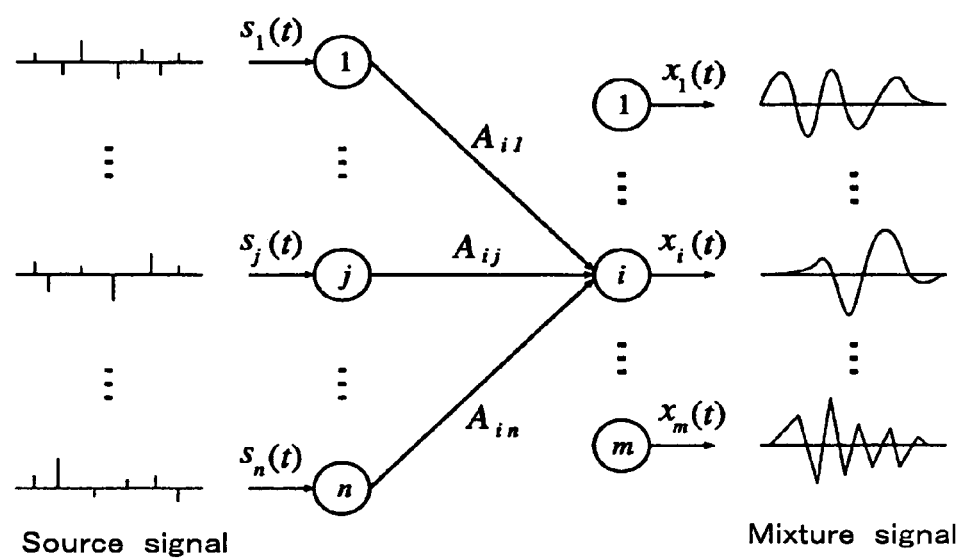
FIG. 3 is a diagram showing a network model representing a way of making a convolution.

A principle of the invention will be described below. Firstly, the temporally and spatially mixed signals are formulated. It is supposed that the time series signal s(t)={$s_1$(t), . . . , $s_n$(t)} is generated from n signal sources. It is assumed that the time series signals $s_j$(t) (1≦j≦n) are independent of each other temporally and spatially and follow the same distribution. When these signals are mixed (convoluted) temporally and spatially, m signals x(t)={$x_1$(t), . . . , $x_m$(t)} are obtained and expressed as follows.

$$x_i(t) = \sum_{j=1}^{n} \sum_{\tau=-\infty}^{\infty} A_{ij}(\tau)s_j(t-\tau) \quad \text{(formula 8)}$$

Where 1≦i≦m, and $A_{ij}$ represents the convolution filter. In FIG. 3, the convolution filters are represented in a network model. As shown in FIG. 3, for example, $x_i$(t) that is a component of x(t) is produced by applying the filters $A_{i1}$, . . . $A_{ij}$, . . . $A_{in}$ to $s_1$(t), . . . $s_j$(t), . . . $s_n$(t) that are components of the source signal s(t).

In this invention, the temporally and spatially mixed signal represented in formula 8 is represented as a linear sum of bases such as the matrix model x=As represented in formula 1 in accordance with the Lewickis' learning algorithm.

First of all, for the sake of simplicity, a case of m=1 and n=1 is considered. That is, the temporally and spatially mixed signal in which one source signal is convoluted as one mixture signal is considered. The subscripts of $A_{11}$, $x_1$ and $s_1$ are omitted. From the formula 8, it follows that $$x(t) = \sum_{\tau=-\infty}^{\infty} A(\tau)s(t-\tau) \quad \text{(formula 9)}$$

$$= A(t) * s(t) \quad \text{(formula 10)}$$

$$= \sum_{\tau=-\infty}^{\infty} A(t-\tau)s(\tau) \quad \text{(formula 11)}$$

Herein, any consecutive (2q+1) points [x(-q), . . . , x(0), . . . , x(q)] among the infinite time series signal x(t) are formally represented in the matrix, using the formula 11, and given in the formula 12 and the formula 13 shown in FIG. 18. The matrix of the formula 13 indicates the matrix A in the formula 12. Also, it is supposed that the length of filter A(τ) is 2q+1, and the value of A(τ) is 0 in the range τ<-q and τ>q.

That is, A(t)=[ . . . , 0, 0, A(-q), . . . , A(0), . . . , A(q), 0, 0, . . . ]

Figure 4:
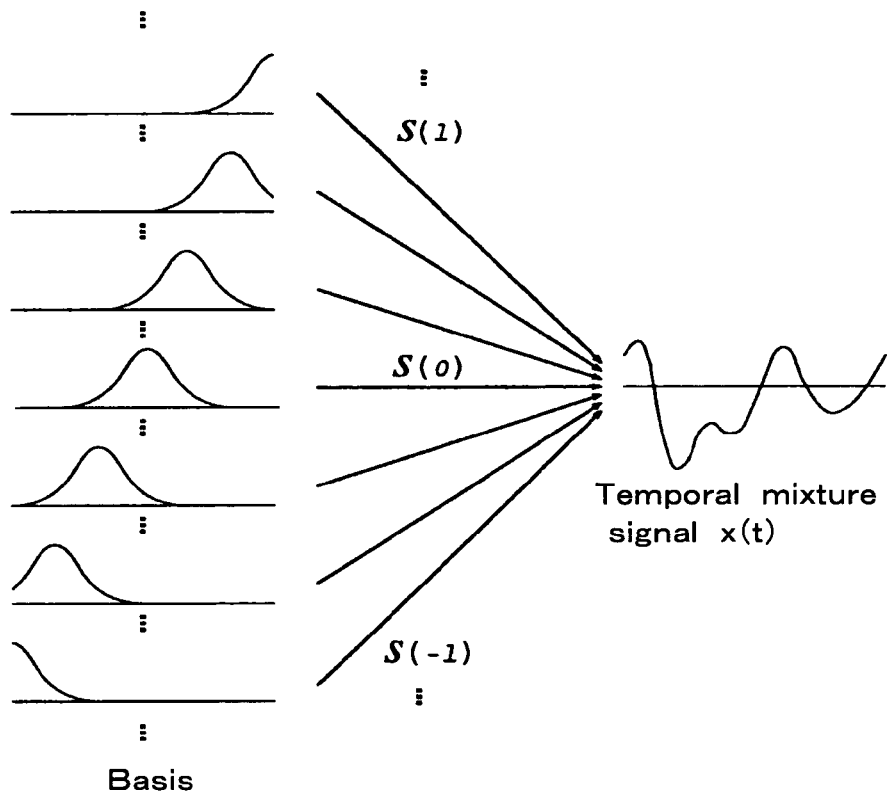
FIG. 4 is a diagram representing a temporally and spatially mixed signal x(t) as a linear sum of bases.

Herein, noting each column of the matrix A in the formula 13, the elements in each column are shifted by one point but composed of the same filter. Regarding each column as one basis function, each basis has phase symmetry (temporal symmetry). Therefore the temporally and spatially mixed signal x(t) is represented as a linear sum of bases, as shown in the model of FIG. 4.

In this manner, considering the filter having the phase symmetry (temporal symmetry) as the basis, the signal mixed with time delay can be represented as the linear sum of bases.

Herein, the matrix having the column in which filter $A_{ij}(\tau)=[A_{ij}(-q), \ldots, A_{ij}(0), \ldots, A_{ij}(q)]$ is shifted in phase by one point as shown in the formula 13 is defined as a small matrix $A_{ij}$ in this invention.

Though in the formula 12 and the formula 13, only one source signal s(t) is mixed with time delay, when n source signals {$s_1$, . . . , $s_n$} are mixed temporally and spatially into m signal {$x_1$, . . . , $x_m$}, and formulated with the matrix, a linear model of the mixed signals is represented in the expression shown in FIG. 19.

Herein, suppose that $x_i$(t)=[$x_i$(-q), . . . , $x_i$(0), . . . , $x_i$(q)](1≦i≦m) and $s_j$(t)=[$s_j$(-2q), . . . , $s_j$(0), . . . , $s_j$(2q)] (1≦j≦n). {$x_1$, . . . , $x_m$} denotes m mixture signals and {$s_1$, . . . , $s_n$} denotes n source signals.

A combination of a plurality of matrixes and vectors contained in the formula 14 is integrated into one expression and formulated as an operation expression x=As. The matrix A in this operation expression is a basis matrix, and the small matrixes {$A_{ij}$} composing the basis matrix A are basis small matrixes. The operation expression is applied to the Lewickis' learning algorithm based on overcomplete representations. Herein, the basis matrix A is represented as the expression shown in FIG. 20.

And the m×n small matrixes (basis small matrixes) {$A_{ij}$} composing the basis matrix A are represented as the expression shown in FIG. 21.

Since the temporally and spatially mixed signal $x_i$(t) as the input signal contains n filter components {$A_{i1}, A_{i2}, \ldots, A_{in}$} as shown in FIG. 3, it is expected that any of filter components {$A_{i1}, A_{i2}, \ldots, A_{in}$} is extracted for each of n basis small matrixes {$A_{ij}$} (1≦j≦n) of the basis matrix A with the phase shifted by learning according to this invention.

Herein, though the overcomplete basis matrix is usually learned in accordance with the formula 6, it is presumed that each column of m×n basis small matrixes {$A_{ij}$} composing the basis matrix A is made up of one vector $A_{ij}$(t)=[$A_{ij}$(-q), . . . , $A_{ij}$(0), . . . , $A_{ij}$(q)], that is, each column of the basis small matrixes {$A_{ij}$} has phase symmetry.

If all the elements in the matrix are learned according to the invention, the shape of each column of the basis small matrixes {$A_{ij}$} is different to collapse the phase symmetry (temporal symmetry) of bases.

Thus, in this invention, the basis matrix A is learned according to the following procedure so that each column of the basis small matrixes {$A_{ij}$} has the phase symmetry while the basis matrix A is corrected by learning, whereby the mixture matrix that is the optimal basis matrix A, and the source signals are estimated by this learning.

(1) The temporally and spatially mixed signals $x_i$(t) are input, and the basis matrix A in which basis small matrixes{$A_{ij}$} (1≦i≦m, 1≦j≦n) having the phase symmetry of bases are gathered and $s_j$(t) are formulated as an operation expression as shown in the formula 14.

Where $x_i(t)=[x_i(-q), \ldots, x_i(0), \ldots, x_i(q)](1 \leq i \leq m)$ and $s_j(t)=[s_j(-2q), \ldots, s_j(0), \ldots, s_j(2q)](1 \leq j \leq n)$.

(2) The vector (basis) located in the (q+1)th column, namely, in the middle column, of the m×n basis small matrix {$A_{ij}$} contained in the basis matrix A is corrected by learning. The basis after learning is supposed the (2q+1)-point vector [^$A_{ij}$(-q), . . . , ^$A_{ij}$(0), . . . , ^$A_{ij}$(q)]. More specifically, the basis matrix A is corrected for the vector (basis) in the middle column of the basis small matrixes {$A_{ij}$} composing the basis matrix A in accordance with a learning rule ΔA in the formula 7.

(3) The basis small matrixes are reconfigured on the bases after learning in the form of the formula 13. That is, the vector (basis) after learning in item (1) is shifted in phase successively to produce plural vectors (bases) having different phase, and the new basis small matrixes $\{\char`\^A_{ij}\}$ which consist of the bases after learning and the bases having different phase produced after learning are formed.

(4) The basis matrix A is reconfigured by arranging the basis small matrixes $\{\char`\^A_{ij}\}$ in the form of the formula 14. The basis matrix A obtained thereby is regarded as the learned basis matrix.

(5) The above (1) to (4) are repeated by changing the input temporally and spatially mixed signals, until the basis matrix A fully converges. And the converged value of the basis matrix A is calculated as the mixture matrix and the source signals are estimated. The estimated source signals *$s_j(t)$ ($1 \leq j \leq n$) are the solution ^s in the formula 2 when the basis matrix A has converged.

As described above, with this invention, regarding the filter having phase symmetry as the basis, the mixed signal with time delay is represented as a linear sum of bases, and then the Lewickis' learning algorithm is applied.

That is, the present invention provides a signal separation system for separating plural source signals before mixture from mixture signals having the source signals mixed temporally and spatially, comprising signal input means for inputting the mixture signals, signal storing means for storing the input mixture signals, and signal separation means for extracting the mixture signals stored in the signal storing means and separating the source signals from the extracted mixture signals, wherein the signal separation means transforms the extracted mixture signals into a linear sum of bases, and separates the source signals using a learning algorithm based on overcomplete representations.

Also, this invention provides the blind signal separation system, wherein the signal separation means formulates the extracted mixture signals as an operation expression using a basis matrix composed of plural small matrixes which consist of the bases with time symmetry around the time axis shifted, and calculates a mixture matrix to produce the mixture signals by mixing the source signals temporally and spatially to estimate the source signals to be separated, using the operation expression and the learning algorithm based on the overcomplete representations.

Also, the invention provides the blind signal separation system, wherein on using the learning algorithm based on the overcomplete representations, the signal separation means calculates the mixture matrix and estimates the source signals to be separated by correcting a basis located in the middle column of the plural small matrixes in accordance with the learning algorithm based on the overcomplete representations.

Also, the invention provides a signal separation method for separating plural source signals before mixture from mixture signals having the source signals mixed temporally and spatially, the method including a signal input step of inputting the mixture signals, a signal storing step of storing the input mixture signals, and a signal separation step of extracting the mixture signals stored at the signal storing step and separating the source signals from the extracted mixture signals, wherein the signal separation step includes transforming the extracted mixture signals into a linear sum of bases, and separating the source signals using a learning algorithm based on overcomplete representations.

Also, the invention provides the blind signal separation method, wherein the signal separation step includes formulating the extracted mixture signals as an operation expression using a basis matrix composed of plural small matrixes which consist of the bases with time symmetry around the time axis shifted, and calculating a mixture matrix to produce the mixture signals by mixing the source signals temporally and spatially and estimating the source signals to be separated, using the operation expression and the learning algorithm based on the overcomplete representations.

Also, the invention provides the blind signal separation method, wherein on using the learning algorithm based on the overcomplete representations, the signal separation step includes calculating the mixture matrix and estimating the source signals to be separated by correcting a basis located in the middle column of the plural small matrixes in accordance with the learning algorithm based on the overcomplete representations.

Also, the invention provides a blind signal separation program for enabling a computer to perform the blind signal separation method.

Also, the invention provides a recording medium that records the blind signal separation program for enabling a computer to perform the blind signal separation method.

With this invention, the source signals can be separated from the mixture signals into which the source signals are mixed temporally and spatially, where the number of source signals is greater than or equal to the number of mixture signals.

The present invention realizes an object of separating source signals, the number of which is more than or equal to the number of mixture signals, from the mixture signals into which the source signals are mixed temporally and spatially in such a way as to formulate the mixture signals as an operation expression of a basis matrix and the source signals, namely, to transform the mixture signals into a linear sum of bases and apply a learning algorithm based on overcomplete representations.

Figure 1:
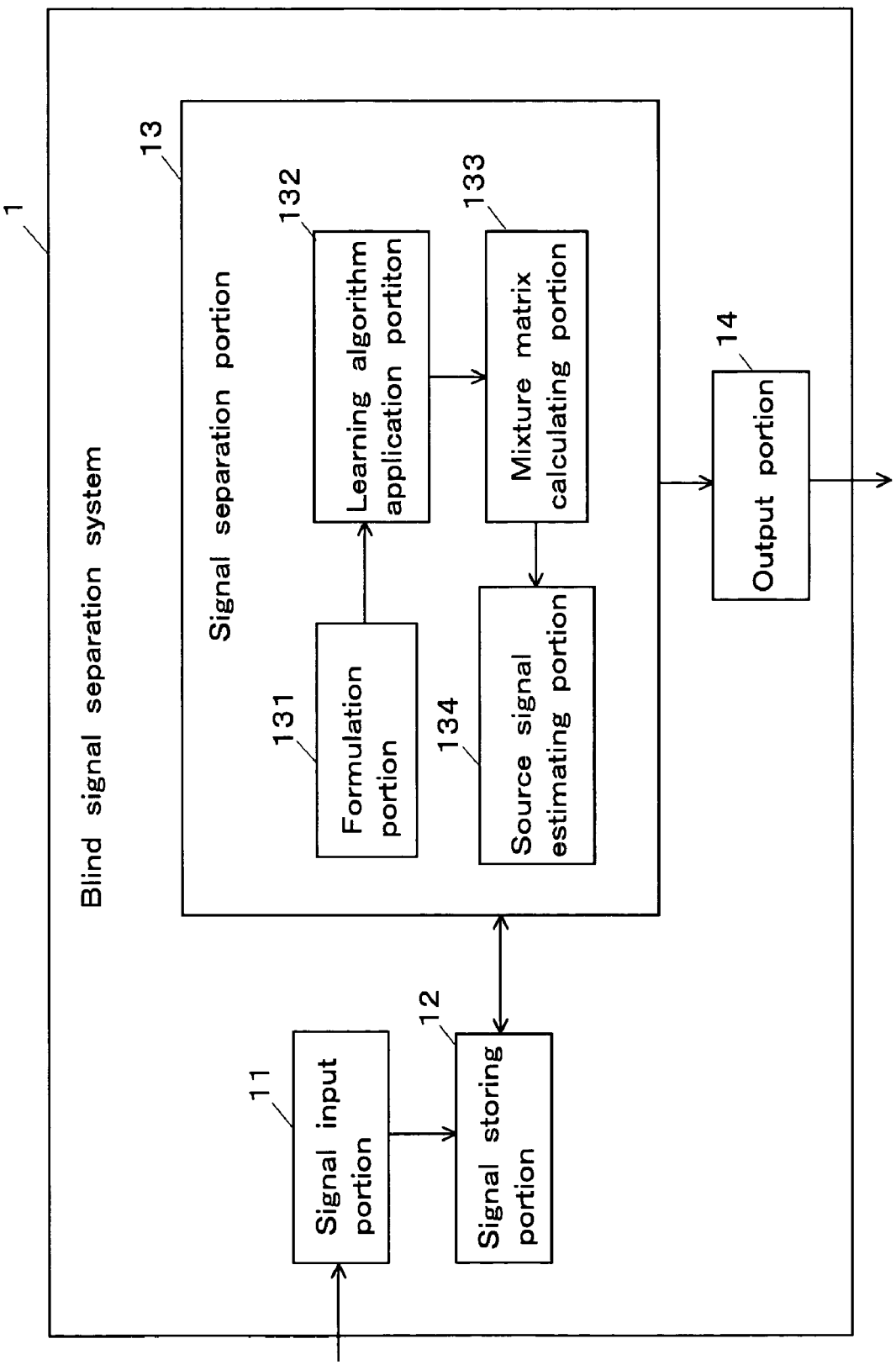
FIG. 1 is a block diagram showing the configuration of a system according to an embodiment of the present invention.

FIG. 1 is a diagram showing the configuration of a system according to an embodiment of the invention. Reference numeral 1 denotes a blind signal separation system, 11 denotes a signal input portion for inputting the mixture signals into which the source signal are mixed temporally and spatially, 12 denotes a signal storing portion for storing the input mixture signals, 13 denotes a signal separating portion for separating the source signals from the mixture signals by extracting the mixture signals from the signal storing portion 12, and calculating a mixture matrix based on the extracted mixture signals and estimating the source signals, and 14 denotes an output portion for outputting the calculated mixture matrix and the estimated source signals.

The signal separation portion 13 comprises a formulation portion 131 for formulating the mixture signals as an operation expression of a basis matrix and the source signals, a learning algorithm application portion 132 for applying a learning algorithm based on overcomplete representations as proposed by Lewicki et al., a mixture matrix calculating portion 133 for calculating the mixture matrix, and a source signal estimating portion 134 for estimating the source signals.

That is, in the present invention, for example, the mixture signals are input into the signal input portion 11, and stored in the signal storing portion 12. And the formulation portion 131 within the signal separation portion 13 extracts the mixture signals stored in the signal storing portion 12, and formulates the extracted mixture signals as an operation expression of the basis matrix and the source signals.

And the learning algorithm application portion 132 applies the learning algorithm based on overcomplete representations as proposed by Lewicki et al. The mixture matrix calculating portions 133 calculates the mixture matrix. The source signal estimating portion 134 estimates the source signals. And the output portion 14 outputs the calculated mixture matrix and the estimated source signals.

Figure 5:
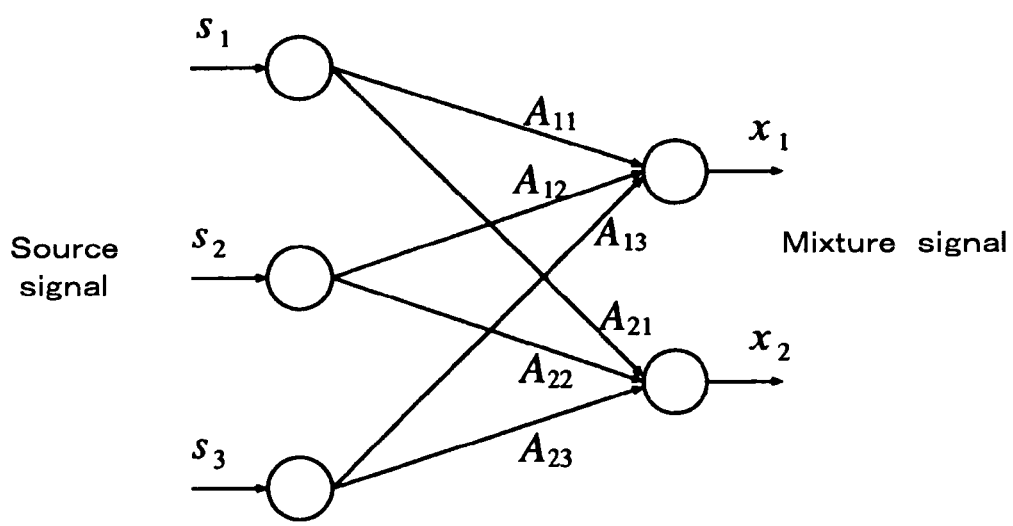
FIG. 5 is a diagram showing a way of applying the filters to the source signals.

In a specific embodiment of the invention, three source signals are mixed in advance temporally and spatially to create two mixture signals, and the source signals are separated from the mixture signals, using the blind signal separation system 1 of the present invention. For example, three source signals are converted into mixture signals $x_1(t)$ and $x_2(t)$ by applying the filters $A_{11}$ to $A_{23}$, as shown in FIG. 5.

In an embodiment of the invention, the basis small matrixes $A_{11}$ to $A_{mn}$ in the formula 14 had all the dimension of 63×125 to make the experiment. That is, two 63-dimensional input mixture signals ($x_1(t), X_2(t)$) are prepared, so that three 125-dimensional output signals are obtained. Also, the standard deviation of the output signals by learning was normalized to 1, whereby a parameter θ was set to $\sqrt{2}$.

Three source signals in 10000 impulse signal train ($[s_j(1), \ldots, s_j(10000)](1 \leq j \leq 3)$) occurring at intervals according to a Poisson distribution with modulus 60 were prepared. The amplitude width was decided according to the uniform random number in a range [−1,1].

Figure 6:
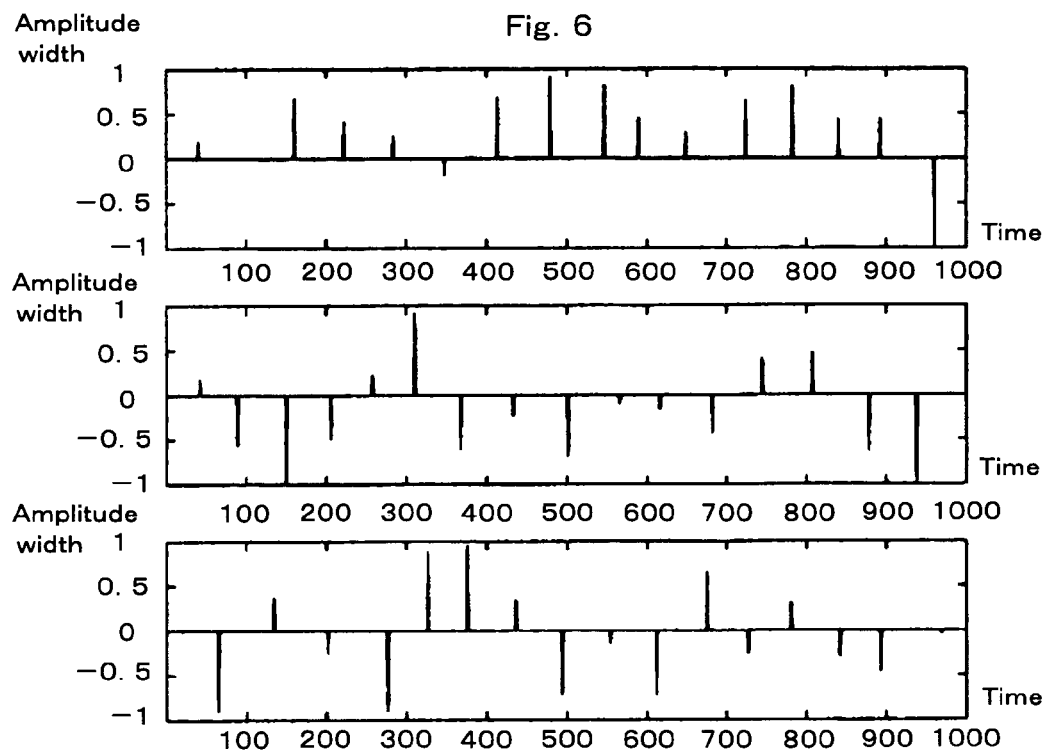
FIG. 6 is a diagram showing the source signals.

First 1000 points of each source signal are shown at the upper, middle and lower stages in FIG. 6. The longitudinal axis represents the amplitude width and the transverse axis represents the time.

Figure 7:
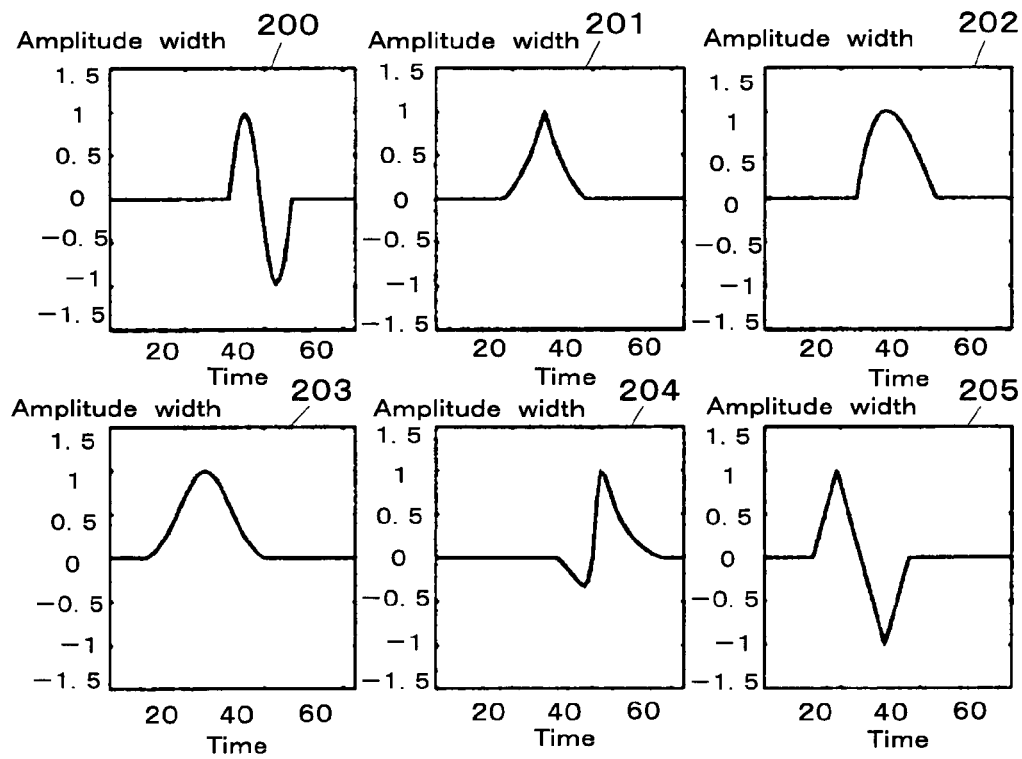
FIG. 7 is a graph showing a filter used for convolution.

The mixture signals as input data were created by convoluting three source signals of FIG. 6 temporally and spatially in accordance with the formula 8. The filters used for convolution are shown in FIG. 7. The longitudinal axis represents the amplitude width and the transverse axis represents the time.

In FIG. 7, 200 denotes a filter $A_{11}(t)$, 201 denotes a filter $A_{12}(t)$, 202 denotes a filter $A_{13}(t)$, 203 denotes a filter $A_{21}(t)$, 204 denotes a filter $A_{22}(t)$, and 205 denotes a filter $A_{23}(t)$.

Figure 8:
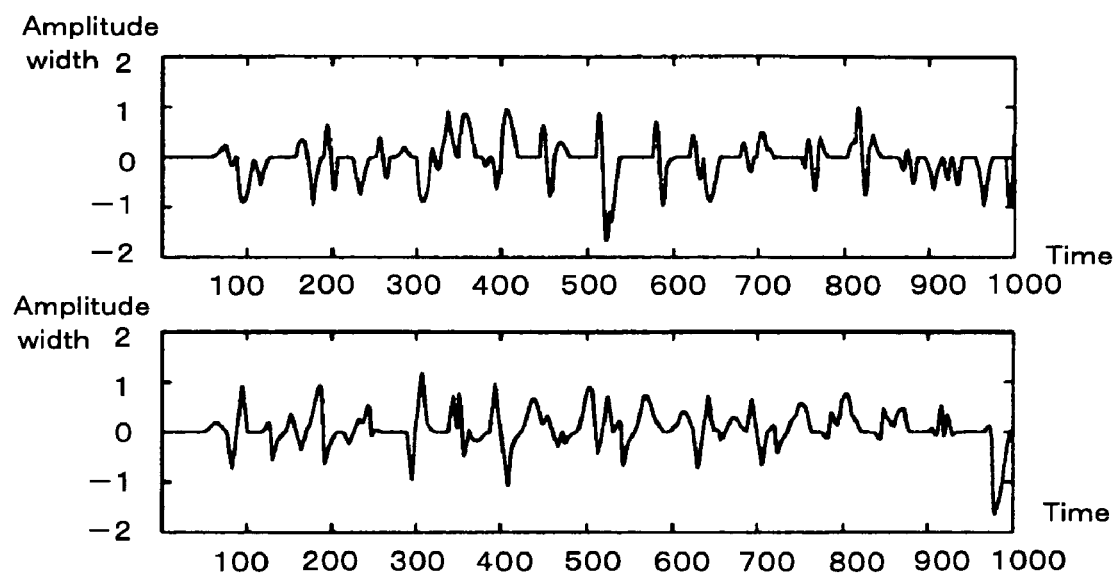
FIG. 8 is a chart representing the temporally and spatially mixed signals.

Also, first 1000 points of two mixture signals $x_1(t)$ and $x_2(t)$ obtained by convolution are shown in FIG. 8. The longitudinal axis represents the amplitude width and the transverse axis represents the time. $x_1(t)$ is shown at the upper stage and $x_2(t)$ is shown at the lower stage.

Also, the initial value of basis is a vector of uniform random numbers of 63 points generated in a range [−1,1], which is multiplied by a windowing function of Gauss distribution. This is intended to concentrate the power in the center, and extract the filter components as close to the center as possible. From 125 basis functions obtained by shifting the phase every one point, 63×125 basis small matrixes $\{A_{ij}\}$ are formed. Thus, the initial value of the basis matrix A is obtained by preparing 2×3 kinds of the basis small matrixes and arranging them as in the formula 14.

Figure 9:
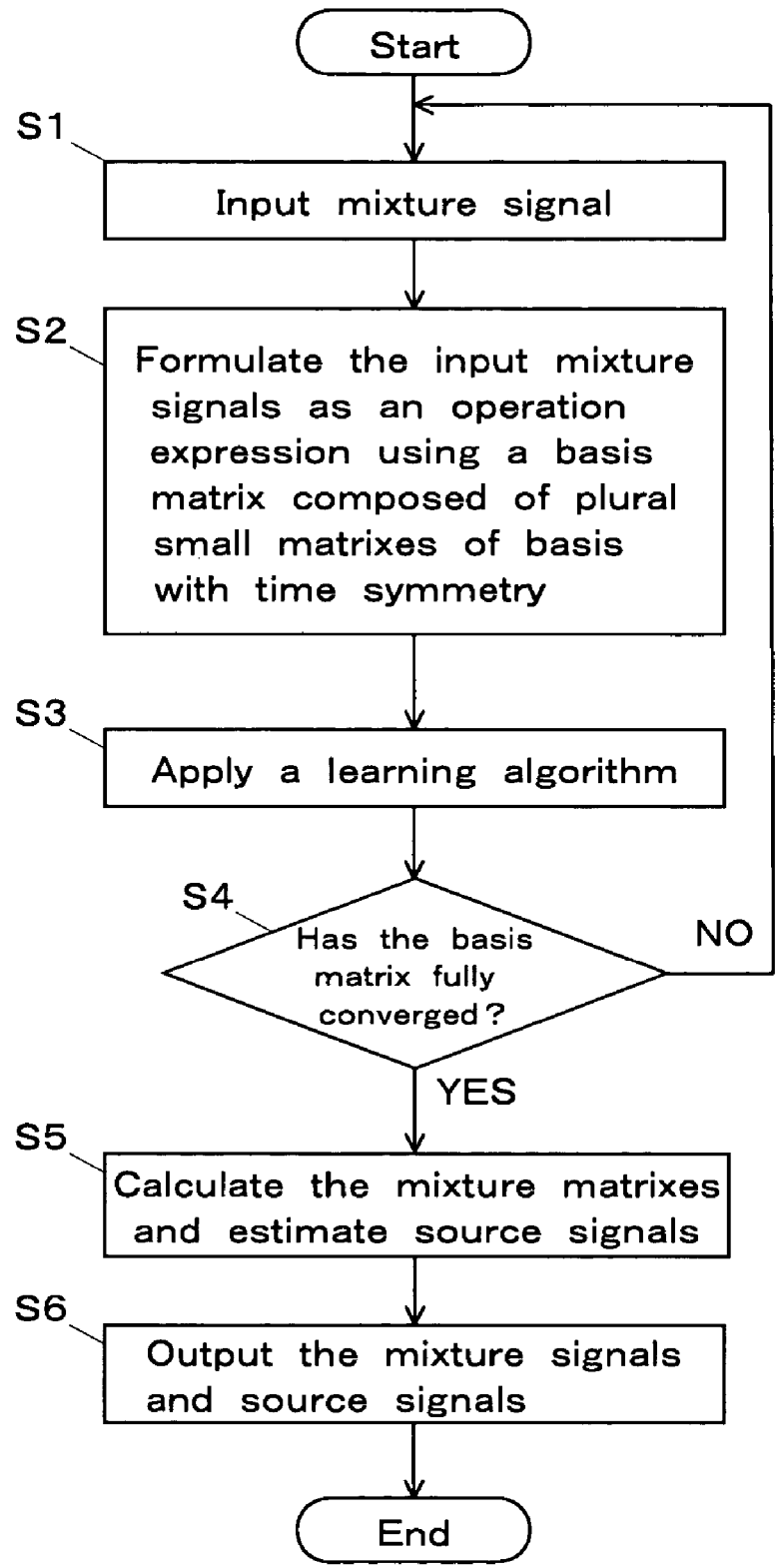
FIG. 9 is a flowchart showing an example of a blind signal separation process.

FIG. 9 is a flowchart showing a blind signal separation process according to an embodiment of the invention. First of all, the mixture signals into which the source signals are mixed temporally and spatially are input into the signal input portion 11 (step S1). For example, 63 consecutive points in the same time space are randomly extracted from two mixture signals $x_1(t)$ and $x_2(t)$ as shown in FIG. 8, so that the respective input data [$x_1(-31), \ldots, x_1(31)$] and [$x_2(-31), \ldots, x_2(31)$] are acquired, and input into the signal input portion 11 of the blind signal separation system 1.

Then, the formulation portion 131 formulates the input mixture signals ($x_1(t), x_2(t)$) as an operation expression using the basis matrix composed of plural small matrixes that are bases with time symmetry (step S2). For example, the initial value of the basis matrix A is obtained by forming 63×125 basis small matrixes $\{A_{ij}\}$ ($1 \leq i \leq 2, 1 \leq j \leq 3$), and collecting 2×3 kinds of basis small matrixes, as described above, whereby the input mixture signals ($x_1(t), x_2(t)$) are formulated into the operation expression as shown in the formula 14. More specifically, they are formulated into the operation expression as shown in FIG. 10.

Here, the basis small matrixes $\{A_{ij}\}$ are configured as shown in FIG. 11, for example. Also, the source signals $s_j(1 \leq j \leq 3)$ in the operation expression as shown in FIG. 10 are configured as shown in FIG. 12, for example.

Next, the learning algorithm is applied by the learning algorithm application portion 132 (step S3). For example, the learning algorithm application portion 132 applies the learning algorithm based on overcomplete representations as proposed by Lewicki et al. in the following way.

(1) Using the operation expression as shown in FIG. 10, three output signals $s_1(t), s_2(t)$ and $s_3(t)$ are obtained by the linear programming method of the formula 2. In an embodiment of the invention, a free software lp_slove is employed for computation in the linear programming.

(2) The learning rule ΔA is computed from the output signals obtained according to the procedure (1), using the formula 6.

(3) Using the formula 7, the bases are corrected. At this time, correction is made for the bases located in the middle column of the basis small matrixes $\{A_{ij}\}$ ($1 \leq i \leq 2, 1 \leq j \leq 3$) composing the basis matrix A before correction, as previously described. That is, correction is made for the bases located in the middle column of the basis small matrixes $\{A_{ij}\}$ as surrounded by the dotted line in FIG. 13.

(4) Based on the bases after correction, the small matrixes are reconfigured in the form of the formula 13. That is, the new small matrixes $\{^{\wedge}A_{ij}\}$ are composed of the bases located in the middle column after correction and plural vectors with the bases successively shifted in phase.

(5) The new small matrixes $\{^{\wedge}A_{ij}\}$ are arranged in the form of the formula 14 and configured into the basis matrix as surrounded by the dotted line in FIG. 14. The basis matrix A obtained thereby is the learned basis matrix.

Then, the learning algorithm application portion 132 determines whether or not the basis matrix A has fully converged (step S4). If the basis matrix A has not fully converged, the steps 1 to 3 are repeated by changing the input temporal and spatial mixture signals, until the basis matrix A fully converges.

In an embodiment of the invention, for example, the steps 1 to 3 are repeated by 70000 times. The learning ratio η in the formula 7 was set to 0.0005 from the first time of input to 3000th time, 0.00025 from the 3001st to 20000th time, 0.00005 from the 20001st to 40000th time, and 0.00001 from the 40001st time and beyond.

When the basis matrix A has fully converged, the mixture matrix calculating portion 133 calculates the converged value of the basis matrix A as the mixture matrix, and the source signal estimating portion 134 estimates the source signals (step S5). In an embodiment of the invention, the source signals are estimated as the solution of the formula 2 when the basis matrix A has become the converged value. As a result, three source signals (*$s_j(t)$ ($1 \leq j \leq 3$)) are estimated. Finally, the output portion 14 outputs the calculated mixture matrix and the estimated source signals (step S6). Then, the procedure is ended.

Figure 15:
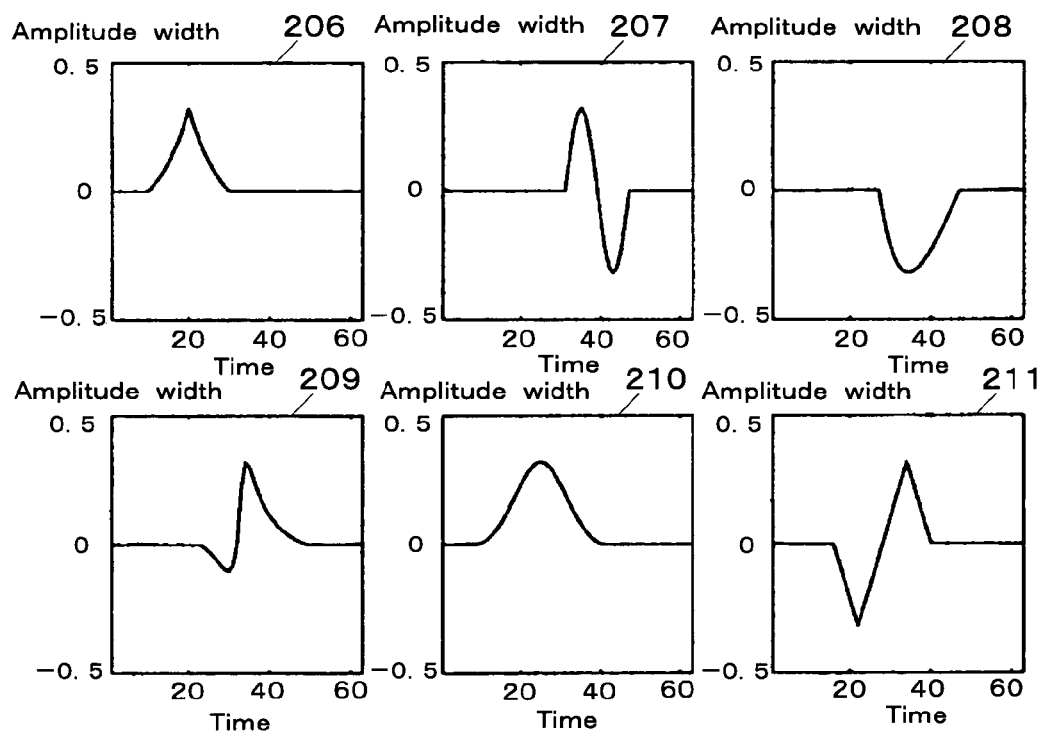
FIG. 15 is a graph showing a basis obtained by learning.

FIG. 15 shows the bases of the mixture matrix calculated in an embodiment of the present invention. In FIG. 15, 206 denotes the middle column of the basis small matrix $A_{11}$ composing the calculated mixture matrix, 207 denotes the middle column of the basis small matrix $A_{12}$, 208 denotes the middle column of the basis small matrix $A_{13}$, 209 denotes the middle column of the basis small matrix $A_{21}$, 210 denotes the middle column of the basis small matrix $A_{22}$, and 211 denotes the middle column of the basis small matrix $A_{23}$. The longitudinal axis represents the amplitude width and the transverse axis represents the time. They are estimated filters used when the source signals are convoluted.

It is confirmed how correctly the source signals (*$s_1(t)$, *$s_2(t)$,*$s_3(t)$) are estimated from the mixture matrix composed of the basis small matrixes $A_{11}$ to $A_{23}$ and the input mixture signals.

Figures 16, 17:
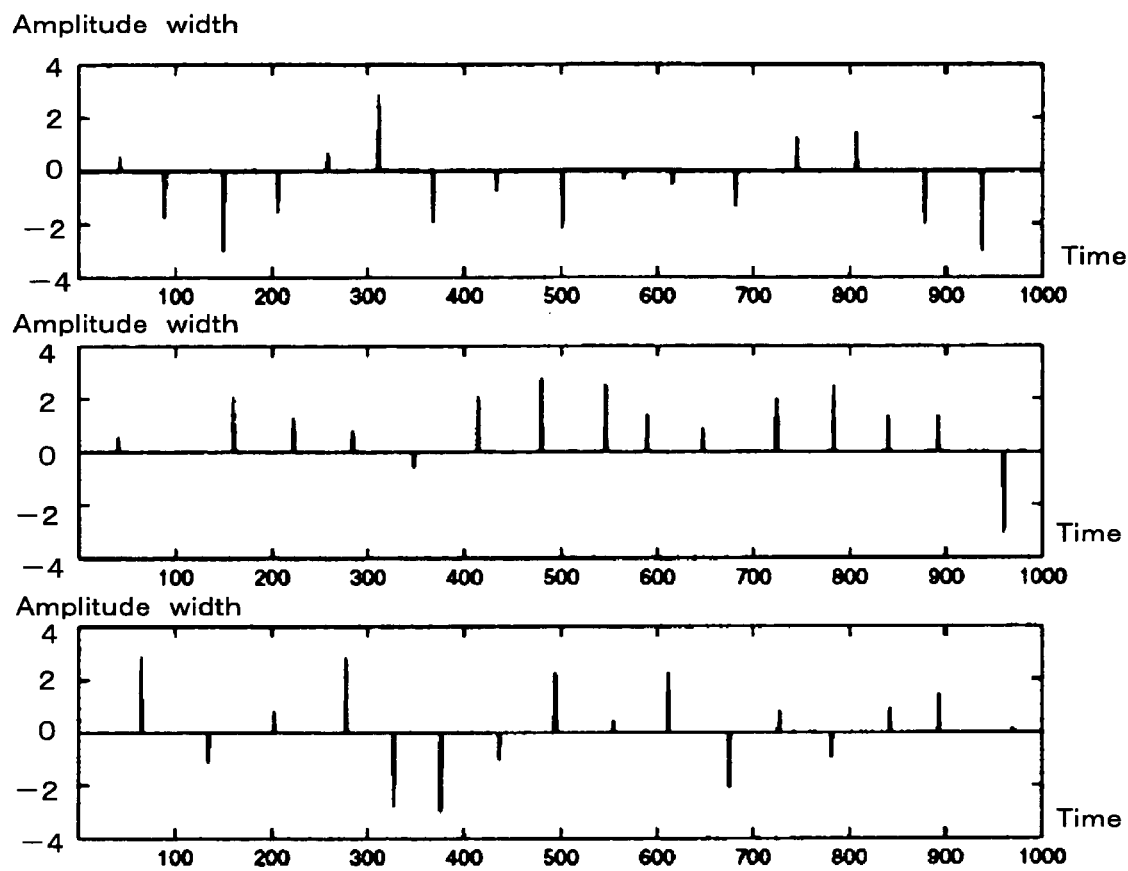
FIG. 16 is a chart showing the estimated source signals.
FIG. 17 is a table showing the correlation coefficients between the source signals and the estimated source signals.

FIG. 16 shows three source signals (estimated signals) estimated in an embodiment of the invention. The longitudinal axis represents the amplitude width and the transverse axis represents the time. When the signals at the upper, middle and lower stages in FIG. 16 are the estimated signal 1 (*$s_1(t)$), the estimated signal 2 (*$s_2(t)$) and the estimated signal 3 (*$s_3(t)$), the correlation coefficients between the source signals $s_1(t)$, $s_2(t)$, $s_3(t)$ and the estimated source signals (estimated signals) in creating data are shown in FIG. 17. From FIG. 17, it can be found that the estimated signal 1, the estimated signal 2 and the estimated signal 3 are highly correlated with the source signal $s_2(t)$, the source signal $s_1(t)$ and the source signal $s_3(t)$, respectively.

Consequently, since the source signals were roughly estimated, it is confirmed that the blind signal separation system 1 of the invention actually enables the multi-channel blind signal separation.

In an embodiment of the invention, the method for implementing the blind signal separation based on overcomplete representations has been proposed in which the temporal and spatial mixture signals are represented as a linear model by introducing the phase symmetry into the bases in the learning algorithm based on overcomplete representations. Also, by the computer experiments, more source signals than the number of mixture signals and the filters in the convolution could be estimated for the temporally and spatially mixed signals.

Since proposed method presumes that there is no noise, it is required to add the noise term to the objective function in the formula 2, or take a measure of applying the algorithm of Olshausen et al. to minimize the square root error in practically dealing with the actual data.

This invention is applicable to the uses in which the source signals, the number of which is more than or equal to the number of mixture signals, are separated from the mixture signals into which the source signals are mixed temporally and spatially, for example, the uses in which the source signals are separated from electromyogram signals or audio signals.

What is claimed is:

1. A blind signal separation system for separating plural source signals before mixture from mixture signals having said source signals mixed temporally and spatially, comprising:

signal input means for inputting said mixture signals;

signal storing means for storing said input mixture signals; and signal separation means for extracting the mixture signals stored in said signal storing means and separating said source signals from said extracted mixture signals, wherein said signal separation means formulates said extracted mixture signals as an operation expression using a basis matrix composed of plural small matrixes which consist of the bases with time symmetry around the time axis shifted, and calculates a mixture matrix to produce said mixture signals by mixing said source signals temporally and spatially, and estimates said source signals to be separated, using said operation expression and the learning algorithm based on said overcomplete representations.

2. The blind signal separation system according to claim 1, wherein said signal separation means calculates said mixture matrix and estimates said source signals to be separated by correcting a basis located in the middle column of said plural small matrixes in accordance with the learning algorithm based on said overcomplete representations when using the learning algorithm based on said overcomplete representations.

3. A blind signal separation method for separating plural source signals before mixture from mixture signals having said source signals mixed temporally and spatially, said method including:

inputting said mixture signals;

storing said input mixture signals; and extracting the mixture signals stored at said signal storing step and separating said source signals from said extracted mixture signals, wherein said extracting the mixture signals and separating said source signals includes formulating said extracted mixture signals as an operation expression using a basis matrix composed of plural small matrixes which consist of the bases with time symmetry around the time axis shifted, and calculating a mixture matrix to produce said mixture signals by mixing said source signals temporally and spatially, and estimating said source signals to be separated, using said operation expression and the learning algorithm based on said overcomplete representations.

4. The blind signal separation method according to claim 3, wherein said signal separation step includes calculating said mixture matrix and estimating said source signals to be separated by correcting a basis located in the middle column of said plural small matrixes in accordance with the learning algorithm based on said overcomplete representations when using the learning algorithm based on said overcomplete representations.

5. A blind signal separation program for enabling a computer to perform the blind signal separation method according to claim 3 or 4.

6. A recording medium that records the blind signal separation program for enabling a computer to perform the blind signal separation method according to claim 3 or 4.

\* \* \* \* \*